United States Patent [19]

Yanagisawa

[11] Patent Number: 5,463,601
[45] Date of Patent: Oct. 31, 1995

[54] CD-ROM DISC REPRODUCING APPARATUS WITH MEANS FOR STORING PROGRESSION DATA OF A CONTROL MEANS

[75] Inventor: Tetsu Yanagisawa, Saitama, Japan

[73] Assignee: Sony Corporation, Tokyo, Japan

[21] Appl. No.: 44,132

[22] Filed: Apr. 7, 1993

[30] Foreign Application Priority Data

Apr. 8, 1992 [JP] Japan ................................. 4-087331

[51] Int. Cl.$^6$ ................................................. G11B 17/22
[52] U.S. Cl. .................................. 364/32; 369/33; 369/48
[58] Field of Search ............................... 369/32, 15, 33, 369/47, 48, 54, 77.1, 75.2

[56] References Cited

U.S. PATENT DOCUMENTS

| | | | |
|---|---|---|---|
| 5,119,353 | 6/1992 | Asakura | 369/13 |
| 5,132,947 | 7/1992 | Kameda et al. | 369/32 |
| 5,222,054 | 6/1993 | Muraoka et al. | 369/32 |
| 5,265,083 | 11/1993 | Ishii et al. | 369/77.1 |
| 5,365,502 | 11/1994 | Misono | 369/32 |

FOREIGN PATENT DOCUMENTS

| | | |
|---|---|---|
| 0389261A2 | 9/1990 | European Pat. Off. . |
| 0431590A2 | 6/1991 | European Pat. Off. . |
| 0200706A2 | 11/1986 | France . |
| 4301286 | 10/1992 | Japan ............... 369/77.1 |
| 2146458 | 4/1985 | United Kingdom . |

OTHER PUBLICATIONS

CD–Manufacturing, Sony Develops Portable Multimedia CD–ROM player (Sep. 1993).
Patent Abstracts of Japan, vol. 6, No. 198 (P–147), 7 Oct. 1982 & JP-A-57 108 958 (Casio Computer Co. Ltd), 7 Jul. 1982.
Patent Abstracts of Japan, vol. 13, No. 87 (P–835), 28 Feb. 1989 & JP-A-63 268 179 (Pioneer Electronic Corporation), 4 Nov. 1988.
Patent Abstracts of Japan, vol. 14, No. 542 (P–1137), 30 Nov. 1990 & JP-A-02 230 584 (Seiko Epson Corp), 12 Sep. 1990.

Primary Examiner—Georgia Y. Epps
Assistant Examiner—Tan Dinh
Attorney, Agent, or Firm—Limbach & Limbach; Alan S. Hodes

[57] ABSTRACT

A CD-ROM disc reproducing apparatus of the present invention includes a memory for storing progression data of a program that plays and controls a CD-ROM disc, a power supply switch and a book marker switch. The memory sequentially stores therein progression data of the program. When the playback control of the CD-ROM disc is directly stopped by the power supply switch, the contents of the memory are not saved. However, when the playback control of the CD-ROM disc is stopped by the book marker switch or when the playback control of the CD-ROM disc is interrupted unintentionally, the progression data of the program are saved by the memory. Then, when the playback control of the CD-ROM disc is resumed, the content stored in the memory is accessed and the playback control state of the CD-ROM disc can be recovered to the state presented at a timing point that the playback control state of the CD-ROM disc is interrupted. Thus, even if the power switch is turned off by a particular key because of an urgent business or even if the power switch is turned off by force when the door is unintentionally opened, when the playback is resumed, the playback of the CD-ROM disc is resumed from the operation state presented at a timing point in which the playback is interrupted.

9 Claims, 2 Drawing Sheets

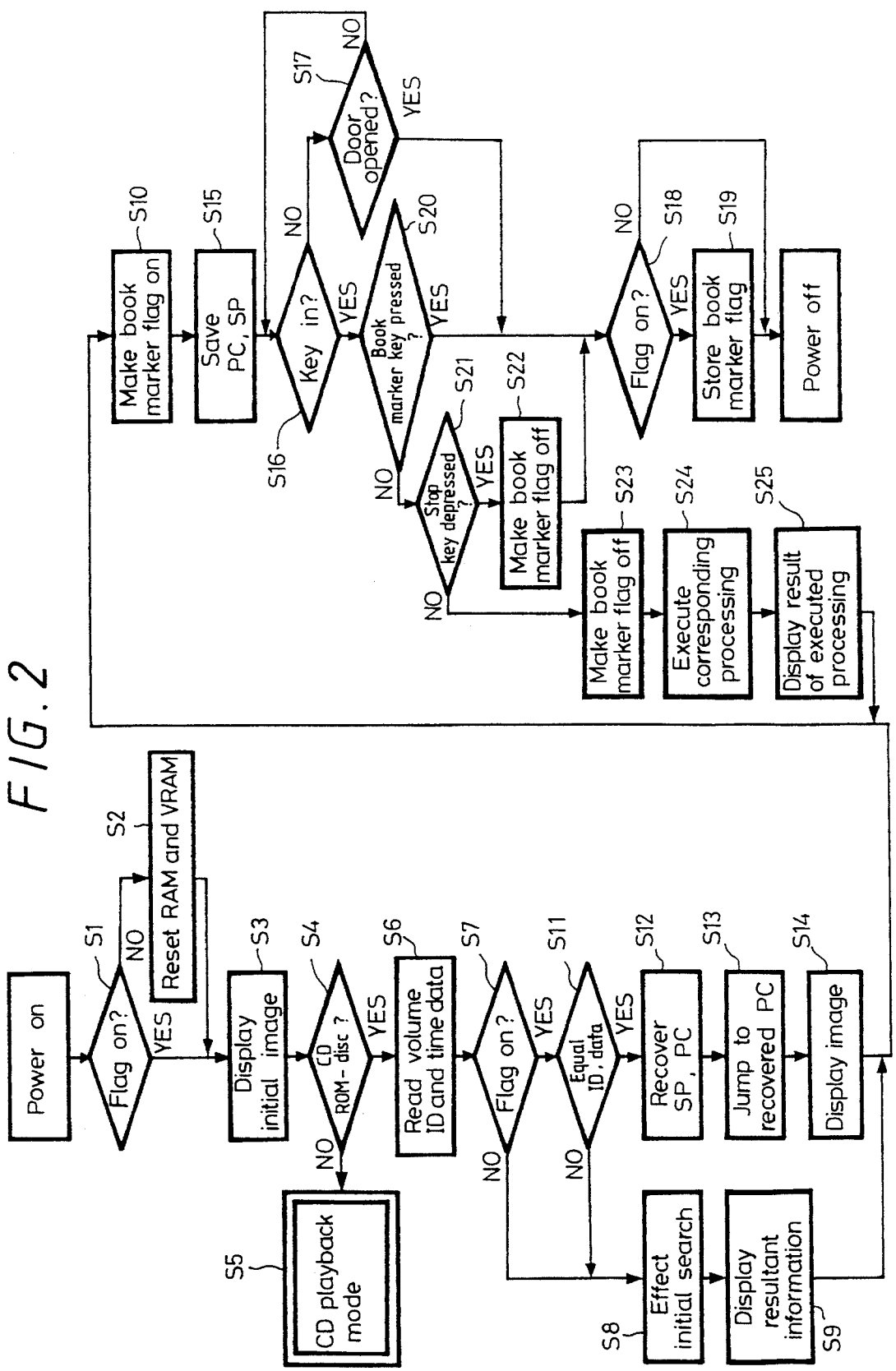

CD-ROM DISC REPRODUCING APPARATUS WITH MEANS FOR STORING PROGRESSION DATA OF A CONTROL MEANS

BACKGROUND OF THE INVENTION

1. Field of the Invention

The present invention relates to a CD-ROM (compact disc read only memory) reproducing apparatus for reproducing a CD-ROM disc on which informations such as dictionaries, encyclopedias, road maps, etc., are converted into digital data and recorded on the basis of a compact disc format.

2. Description of the Relevant Art

One conventional optical disc on which publications such as dictionaries, encyclopedias, road maps, etc., are optically recorded as digital data on the basis of a compact disc format is generally referred to as a CD-ROM disc. CD-ROM discs have recently become popular and have received a remarkable amount of attention; because a vast number of pages can be recorded on one CD-ROM disc, the CD-ROM disc is an optical disc to permit an easy random access, and the CD-ROM disc can be reproduced in a non-contact fashion to guarantee a semi-permanent life, etc.

Because physical characteristics (size, optical characteristics, track pitch, modulation method, etc.) of the CD-ROM disc are in accordance with the CD (compact disc) format, a mechanism of the CD-ROM disc reproducing apparatus can also serve as that of a CD player. Therefore, a player that can play both the CD-ROM disc and the CD can be provided by a minor modification such as the addition of a data decoder exclusively used for the above player.

The disc drive unavoidably includes a door or eject mechanism in order to change the CD-ROM disc. If the door is opened by force upon playback, then the rotating CD-ROM disc is ejected from the player suddenly or a scanning laser beam escapes to the outside, which brings about a very dangerous condition. Therefore, there is proposed a fail-safe that, when the door is opened by force, the power switch is turned off to thereby ensure safety.

If the playback of the CD-ROM disc is resumed after the power switch is turned off because of urgent business or after the power switch is turned off by force when the door is opened unintentionally, then the user must re-execute the disc operations. By way of example, it is frequently observed that, when the user is reading long sentences recorded on the CD-ROM disc, the power switch is turned off because of urgent business or that the power switch is turned off when the door is opened unintentionally. At that time, even though the user wants to resume the playback of the CD-ROM disc, the conventional CD-ROM disc reproducing apparatus cannot resume the playback from the point at which the playback of the CD-ROM disc was interrupted.

OBJECTS AND SUMMARY OF THE INVENTION

In view of the aforesaid shortcomings and disadvantages of the prior art, it is an object of the present invention to provide an improved CD-ROM disc reproducing apparatus in which the aforesaid shortcomings and disadvantages encountered with the prior art can be eliminated.

More specifically, it is an object of the present invention to provide a CD-ROM disc reproducing apparatus in which, when a playback of a CD-ROM disc is resumed, a playback state of a CD-ROM disc can be recovered to the condition presented at the point which the playback of the CD-ROM disc is interrupted.

A CD-ROM disc reproducing apparatus of the present invention includes memory means for storing progression data of a program that plays and controls a CD-ROM disc, a power supply switch means and a book marker switch means. The memory means sequentially stores therein progression data of the program. When the playback control of the CD-ROM disc is directly stopped by the power supply switch means, the contents of the memory means are not saved. However, when the playback control of the CD-ROM disc is stopped by the book marker switch means or when the playback control of the CD-ROM disc is interrupted unintentionally, the progression data of the program are saved by the memory means. Then, when the playback control of the CD-ROM disc is resumed, the content stored in the memory means is accessed and the playback control state of the CD-ROM disc can be recovered to the state presented at the point which the playback control state of the CD-ROM disc is interrupted.

According to an aspect of the present invention, there is provided a CD-ROM disc reproducing apparatus which comprises a disc drive for reproducing data from a CD-ROM disc, a control circuit coupled to the disc drive for controlling operations of said disc drive, an input device including at least first stop key, second stop key, playback key, and alpha-numeric key for entering data and command signals to the control circuit, a display apparatus for displaying at least the data reproduced from the CD-ROM disc by the disc drive, and a memory coupled to the control circuit for effectively storing progression data of the control circuit when the second stop key is operated whenever the control circuit is an input waiting condition, the stored progression data being recovered and the control circuit is put in a condition designated by the recovered progression data when the playback key is operated later on.

The above and other objects, features, and advantages of the present invention will become apparent from the following detailed description of an illustrative embodiment thereof to be read in conjunction with the accompanying drawings.

BRIEF DESCRIPTION OF THE DRAWINGS

FIG. 2 is a flowchart to which references will be made in explaining operation of the CD-ROM disc reproducing apparatus according to the embodiment of the present invention.

DETAILED DESCRIPTION OF THE PREFERRED EMBODIMENT

Figure 1:
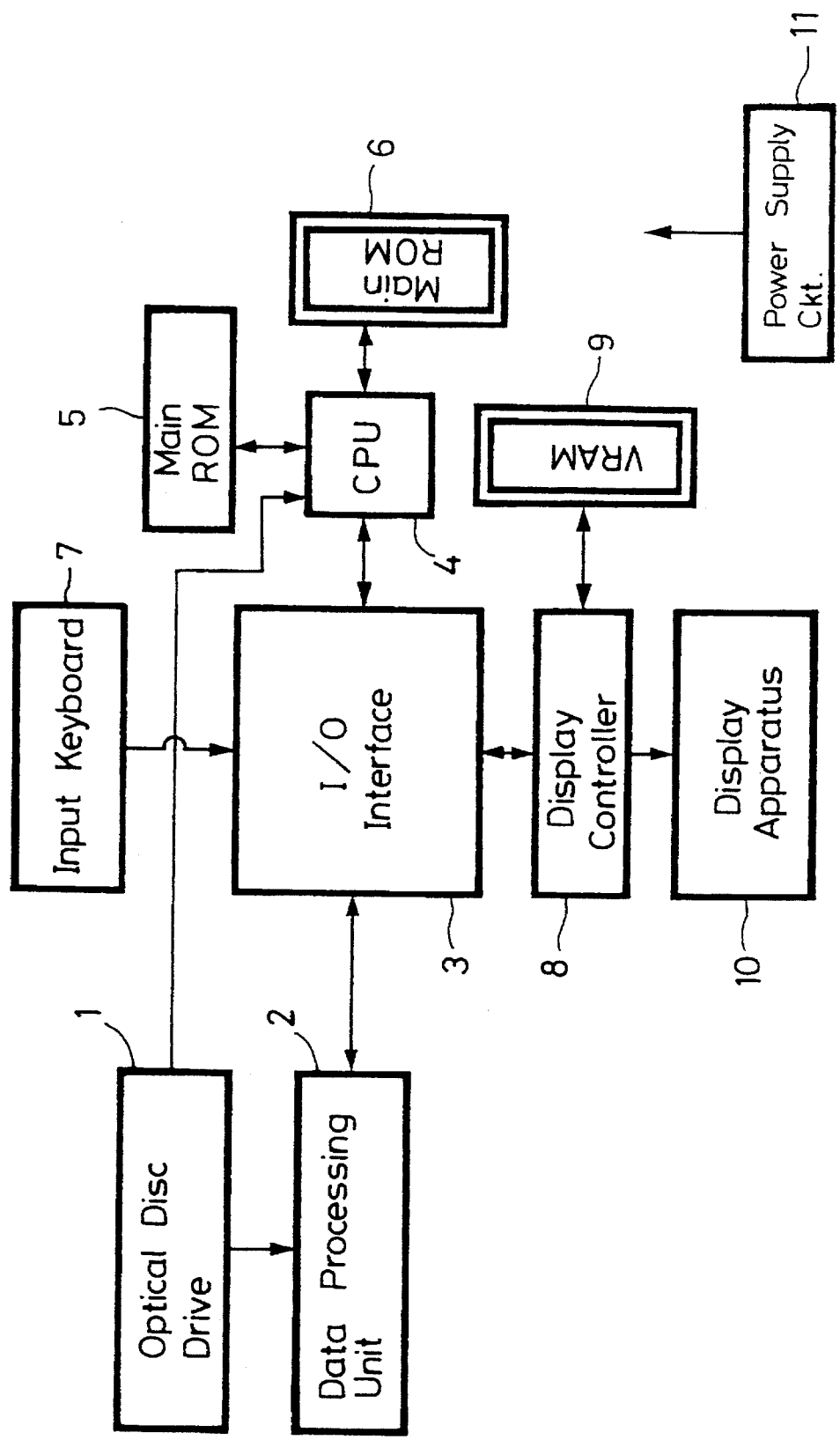
FIG. 1 is a block diagram showing a CD-ROM disc reproducing apparatus according to an embodiment of the present invention.

A CD-ROM disc reproducing apparatus according to an embodiment of the present invention will hereinafter be described with reference to the drawings.

FIG. 1 of the accompanying drawings shows in block form an arrangement of the CD-ROM disc reproducing apparatus according to the embodiment of the present invention. As shown in FIG. 1, there is provided an optical disc drive 1. Similarly to a well-known CD player, the optical disc drive 1 reads out a signal recorded on a CD-ROM disc (not shown) and supplies a read-out signal to a data processing unit 2. The data processing unit 2 is adapted to demodulate data stored in the CD-ROM disc and supplies demodulated data to an I/O (input/output) interface 3. The I/O interface 3 is supplied with an operation command signal from an input keyboard 7. The data and the operation command signal are supplied through the I/O interface 3 to a CPU (central processing unit) 4. The CPU 4 is adapted to control an operation of the entirety of the CD-ROM disc reproducing apparatus on the basis of a program stored in a ROM (read only memory) 5 coupled thereto. The CPU 4 is further coupled to a RAM (random access memory) 6 in which there is stored a command. A control line is coupled to the CPU 4 so that the CPU 4 supplies the optical disc drive 1 with operation commands such as play command, search command, stop command or the like.

An output signal from the I/O interface 3 is supplied to a display controller 8 in order to display graphics video data on a display apparatus 10 such as an LCD (liquid crystal display), a CRT (cathode ray tube) display or the like. The display controller 8 is coupled to a VRAM (video RAM) 9 in which there are stored data to be displayed. A power supply circuit 11 supplies an electric power necessary for operating the aforesaid respective circuits.

An operation of the CD-ROM disc reproducing apparatus thus arranged will be described generally. When a power switch of the CD-ROM disc reproducing apparatus is turned on, the CPU 4 effects predetermined initialize processing in accordance with the program stored in the ROM 5 and controls the display controller 8 so that an initial menu picture is displayed on the display apparatus 10.

When supplied with an arbitrary operation command from the input keyboard 7 by the user, the CPU 4 supplies a search command to the optical disc drive 1 in accordance with the program stored in the ROM 5 to allow the optical disc drive 1 to read out desired data from the CD-ROM disc. The data read out from the CD-ROM disc is temporarily stored in the RAM 6 and the CPU 4 supplies necessary data to the display controller 8 in accordance with the program stored in the ROM 5. The display controller 8 stores data to be displayed in the VRAM 9 and displays the same on the display apparatus 10. The data displayed on the display apparatus 10 is processed in some suitable fashion such as to scroll pages under the control of the display controller 8.

In the CD-ROM disc reproducing apparatus according to this embodiment, a program executed by the CPU 4 serving as a control means is stored in the RAM 6 serving as a sequential memory means. A counter that indicates an address of the RAM 6 which sequentially stores therein progression data of the executed program is referred-to as a stack pointer (SP). A counter that indicates an address of the ROM 5 which stores therein a program now executed is referred to as a program counter (PC).

The input keyboard 7 that is operated by the user includes, in addition to alpha-numeric keys, character keys, cursor key or the like, a stop key (power off key) for turning off a power switch of the apparatus, a play key for turning on the power switch and effecting the playback, a book marker key serving as a second stop key for selecting a book marker mode so that a playback is resumed at the interrupted position when the playback is started again.

If the book marker mode is selected, then the RAM 6 and the VRAM 9 are constantly supplied with an operating power from a back-up power supply (not shown) even when the power switch of the apparatus is turned off. The book marker mode is such one that the CD-ROM disc reproducing apparatus is recovered to the condition just before the operation is interrupted when the play key is operated.

A control operation done by the CPU 4 in the CD-ROM disc reproducing apparatus according to this embodiment will be described with reference to a flowchart forming FIG. 2.

Referring to FIG. 2, when the power switch is turned on and the playback is started, the processing proceeds to the next decision step S1, whereat it is determined whether or not a book marker flag signal is made on. If the book marker mode is not designated by the book marker flag as represented by a NO at decision step S1, then the processing proceeds to step S2. In step S2, data stored in the RAM 6 and the VRAM 9 are reset. Then, the processing proceeds to the next step S3, where a predetermined initial image is displayed on the display apparatus 10. If the book marker mode is designated by the book marker flag as represented by a YES at decision step S1, then the processing proceeds to step S3, where the initial image is displayed on the display apparatus 10. Then, the processing proceeds to the next decision step S4.

It is determined in decision step S4 whether the disc is the CD-ROM disc or the ordinary CD. The CD-ROM disc and the CD can be discriminated from each other by checking identification data, which can identify the two discs, recorded on a TOC (table of contents) recorded on a lead-in area of the disc.

If the disc is not the CD-ROM disc as represented by a NO at decision step S4, then the processing proceeds to a playback routine S5 of the ordinary CD. The CD playback routine S5 will not be described herein. If the disc is the CD-ROM disc as represented by a YES at decision step S4, then the processing proceeds to step S6.

In step S6, a volume ID (identification) and time data are read out from the TOC information. Then, the processing proceeds to the next decision step S7, where it is determined whether or not the book marker mode is designated by the booker marker flag. If the book marker flag is not set, as represented by a NO at decision step S7, then the processing proceeds to step S8, where a pre-determined track of the disc is reproduced (initial search). Then, resultant information is displayed on the display apparatus 10 at step S9 and the processing proceeds to step S10. If the book marker mode is designated by the book marker flag as represented by a YES at decision step S7, then the processing proceeds to the next decision step S11. It is determined in decision step S11 whether or not the volume ID and the time data newly read out at step S6 are equal to previously-stored volume ID and time data. The volume ID and the time data read out in step S6 are stored in the RAM 6. If the volume ID and the time data are not equal as represented by a NO at decision step S11, then the processing proceeds to step S8 because the CD-ROM disc is changed and the book marker mode operation is not effected. As the resultant information displayed at step S9, there are displayed a list of books, contents of books, etc., stored in the CD-ROM disc, for example, and the displayed images might be selected by the user.

If on the other hand the volume ID and the time data are equal as represented by a YES at decision step S11, then the processing proceeds to the next step S12, where values of the stack pointer (SP) and the program counter (PC) stored in the RAM 6 are checked. Then, the processing proceeds to step S13, where the control operation jumps to the program position indicated by the program counter (PC), whereby the operation of the CPU 14 is recovered to the condition presented when the operation is interrupted. In the next step S14, an image presented when the operation is interrupted is displayed on the display apparatus 10, and the processing proceeds to step S10.

In step S10, the book marker flag is set and the processing proceeds to the next step S15, where values of the program counter (PC) and the stack pointer (SP) are saved in the RAM 6. Then, the processing proceeds to the next decision step S16, It is determined in decision step S16 whether or not the CD-ROM disc reproducing apparatus is in the input waiting condition. If the CD-ROM disc reproducing apparatus is not in the input waiting condition as represented by a NO at decision step S16, then the processing proceeds to decision step S17. It is constantly determined in decision step S17 whether the door is opened or the eject button is operated. If the door is opened without depressing the stop button or the eject button is depressed as represented by a YES at decision step S17, then the processing proceeds to the next decision step S18. If the book marker flag is set as represented by a YES at decision step S18, then the processing proceeds to step S19. In step S19, the book marker flag is stored in the RAM 6 and the power switch of the CD-ROM disc reproducing apparatus is turned off. In this case, the RAM 6 and the VRAM 9 are, of course, supplied with a back-up operating power. More specifically, when the book marker flag is stored in the RAM 6 and the operation is ended at step S19, the power switch of the CD-ROM disc reproducing apparatus is turned off in the book marker mode so that the volume ID and the time data are stored in the RAM 6 together with the contents of the stack pointer and the program counter presented when the operation is interrupted and the book marker flag. Therefore, as long as the CD-ROM disc is not changed, whenever the power switch is turned on next, the CD-ROM disc reproducing apparatus is automatically set in the condition presented when the operation is interrupted, as earlier noted.

If on the other hand any key is operated as represented by a YES at decision step S16, then the processing proceeds to the next decision step S20, where it is determined whether or not the book marker key is depressed. If the book marker key is depressed as represented by a YES at decision step S20, then the processing proceeds to the next decision step S18, where it is determined whether or not the book marker flag is set. Then, the book marker flag is stored in the RAM 6 at step S19 and the power switch of the CD-ROM disc reproducing apparatus is turned off. In this state, the power switch is of course turned off in the book marker mode so that, when the power switch is turned on next, the CD-ROM disc reproducing apparatus is automatically placed in the condition presented before the book marker key is depressed.

If the book marker key is not depressed as represented by a NO at decision step S20, then the operation of the CPU 4 proceeds to the next decision step S21. It is determined in decision step S21 whether or not the stop key is depressed (power off). If the stop key is depressed as represented by a YES at decision step S21, then it is determined that the CD-ROM disc reproducing apparatus is not in the book marker mode and the book marker flag is cleared at step S22. Then, the processing proceeds to step S18. Then, the book marker flag is cleared so that the power switch of the CD-ROM disc reproducing apparatus is turned off without storing the book marker flag in the RAM 6. In this case, when the power switch of the CD-ROM disc reproducing apparatus is turned on next, the operation must be effected from the beginning. If neither the stop key nor the book marker key is depressed as represented by a NO at decision steps S20 and S21, or if different keys are depressed, then the processing proceeds to step S23. In step S23, the book marker flag is cleared and the corresponding processing is executed in step S24. Then, the result of the executed processing is displayed on the display apparatus 10 at step S25. Then, the processing returns to step S10 and the processing proceeds through step S15 to step S16, where it is determined whether or not any key is operated. The reason that the book marker flag is cleared at step S23 is as follows. Since the processing by the CPU 4 is executed during the operation in step S24, the CD-ROM disc reproducing apparatus cannot be put in the book marker mode and therefore the book marker flag is made off temporarily.

The CD-ROM disc reproducing apparatus is operated as described above. Let it be assumed that the CD-ROM disc on which data of a dictionary is recorded, for example, is searched and reproduced. Then, the book marker function is effected regardless of the condition that the CD-ROM disc reproducing apparatus is placed, such as when words to be searched are input, when a list of header words searched by the primary search is displayed, when text data is finally displayed together with the header words or the like.

The VRAM 9 is supplied with the back-up operating power as described above. If the VRAM 9 is supplied with the backup operating power, then the picture displayed when the operation of the CD-ROM disc reproducing apparatus is interrupted can be recovered after the processing at step S11. If the picture displayed when the operation of the CD-ROM disc reproducing apparatus need not be recovered, the VRAM 9 need not be supplied with the back-up operating power.

Further, if the RAM 6 has a large storage capacity, when the power switch is turned off, video data stored in the VRAM 9 may be transferred to the RAM 6 to thereby stop the supply of back-up operating power to the VRAM 9.

According to the present invention, even if the power switch of the CD-ROM disc reproducing apparatus is turned off by the book marker key because of urgent business and even if the power switch is turned off by force when the door is opened inadvertently, the operation presented at timing point that the playback is interrupted is stored in the memory means so that the operation of the CD-ROM disc reproducing apparatus can be resumed from the operating condition presented at the interrupted timing point when the playback is resumed.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A CD-ROM disc reproducing apparatus comprising:
   a) disc drive means for reproducing data from a CD-ROM disc;
   b) control means coupled to said disc drive means for executing a program to control operations of said disc drive means;
   c) input means including at least first stop means, second stop means, playback means, and alpha-numeric means for entering data and command signals to said control means;
   d) display means for displaying at least the data reproduced from said CD-ROM disc by said disc drive means; and
   e) memory means coupled to said control means for effectively storing progression data of the program responsive to said second stop means being operated when said control means is an input waiting condition.

2. A CD-ROM disc reproducing apparatus as cited in claim 1, wherein said memory means is continuously supplied with an operating power even when operating power to the other portions of the apparatus is shut off by the operation of said second stop means.

3. A CD-ROM disc reproducing apparatus as cited in claim 1, wherein said memory means does not effectively store said progression data of the program when said first stop means is operated.

4. A CD-ROM disc reproducing apparatus as cited in claim 1, wherein said control means includes means for detecting a flag signal which designates a book marker code, and the flag signal is stored with said progression data of the program in said memory means when the program executed by the control means is in an input waiting condition and said second stop means is operated.

5. A CD-ROM disc reproducing apparatus as cited in claim 4, wherein responsive to said alpha-numeric input means being operated while the program executed by said control means is in the input waiting condition, said flag signal is cleared, and after proper processing by said control means, said flag signal is set and the program executed by the control means is again put in the input waiting condition.

6. A CD-ROM disc reproducing apparatus as cited in claim 4, wherein responsive to said first stop means being operated while the program executed by the control means is in the input waiting condition, said flag signal is cleared, and then the operating power to the apparatus is shut off.

7. A CD-ROM disc reproducing apparatus as recited in claim 1 or 4, wherein said CD-ROM disc has disc identification data and said disc identification data are also stored in said memory means.

8. A CD-ROM disc reproducing apparatus as recited in claim 7, wherein the program executed by said control means causes the stored flag to be examined and the stored disc identification data and disc identification data is reproduced when said playback means is operated.

9. A CD-ROM disc reproducing apparatus as recited in claim 1, further comprising:
   f) means for recovering the stored progression data from the memory means responsive to the playback means being thereafter operated; and
   g) means for putting the program executed by said control means in a condition designated by said recovered progression data.

* * * * *